Patented Oct. 10, 1950

2,525,378

UNITED STATES PATENT OFFICE 2,525,378

METHOD OF MAKING IMPROVED HAND COVERINGS

Joseph Shmikler, Champaign, Ill.

No Drawing. Original application January 10, 1945, Serial No. 572,263, now Patent No. 2,394,532, dated February 12, 1946. Divided and this application December 8, 1945, Serial No. 633,863

2 Claims. (Cl. 2—169)

This application is a divisional application of my copending application 572,263, filed January 10, 1945, which issued into Patent 2,394,532 on February 12, 1946.

This invention relates to a method for making an improved hand covering. In a specific embodiment a plastic material is used as a bond for the seams.

It is an object of this invention to provide an improved hand covering in which hand covering sections have their marginal edges joined by a plastic material and in which the plastic material serves as the only bonding agent.

This invention involves construction of all sorts of hand coverings including gloves, mittens, finger stalls, palm coverings, and the like.

This invention contemplates the use of both thermoplastic and thermosetting materials, although the two are not to be considered equivalent since they may be used for different types of hand covering articles. It does not include rubber or glues and the like.

Some of the thermoplastic materials which are preferred because of their rapid bonding on heating include: rubber hydrochloride, vinyl resin, plasticized polyvinyl chloride, vinylidene chloride, and various cellulose derivatives such as cellulose nitrate. However it is also within the scope of this invention to use the following thermoplastic materials: polyvinyl acetal, casein and its derivatives, cellulose acetate, polystyrene, polyvinyl acetal, ethyl cellulose, polyvinyl formal, methol metacrylate resin, polyvinyl butyrals, cellulose acetate butyrate, and vinyl chloride-acetate copolymer, etc.

Among the preferred thermosetting materials are vinyl resin formaldehyde, polyvinyl acetate emulsions, and phenol formaldehyde resins. However, the following thermosetting materials may be used: urea formaldehyde, melamine formaldehyde, phenolic furfural, etc. It is within the scope of the invention to use the above plastic materials either alone or in admixture.

It is also within the scope of this invention to use certain plasticizers with any of the above materials, such as dibutyl phthalate, tributyl phosphate, toluene sulfonamide, tricresyl phosphate, methoxyethyl phthalate, and others. Also when it is desired to apply a coating of the plastic on the material to be bonded, various solvents may be used, such as toluol, alcohols, acetates, and the like.

Thermosetting materials form a bond with other materials upon heating in the presence of a high frequency current, but thermoplastic materials after the heating step must be allowed to cool to fix the bond.

This invention contemplates the manufacture of an improved hand covering made of the usual materials for hand coverings, but instead of stitching or cementing the seams, either a thermoplastic or a thermosetting material, which forms a bond upon heating, may be used. For example, in the making of a leather glove, a plastic material in the seam between the leather sections may be used, which upon heating forms a bond. It is also useful in bonding together all types of fabrics, as well as leather materials.

There are many advantages in the use of a thermoplastic or thermosetting material for bonding the seams of hand covering articles such as gloves. The use of such a bonding edge permits a less bulky seam and the bond may be made between the various sections of the glove so that it does not need to be turned after the seam is bonded. It is the present practice in making gloves and similar articles that the seam is stitched inside out, and the glove must be turned, which is an expensive and time-consuming operation. By the use of plastic, a seam is obtained which is as strong or stronger than the glove material, which obviates the use of reenforcement along the seam. Such reenforcements are frequently applied along the seams of the gloves of the Gunn-cut type which are to be used in heavy-duty work. Furthermore, the seams are not nearly as bulky and there is more flexibility as to the positioning of the seams. At the present time, the seams of gloves which are used either in heavy-duty work or in work where the gloves must protect the hands from high temperatures, the seams must be placed where they will not be exposed to excessive wear or excessive heat. This often causes a waste in the glove material, since the glove sections can not be cut in the most economical manner. By use of a plastic bond at the seam instead of stitching or cementing not only is a stronger bond obtained, but there is more flexibility in the placing of the seams.

By the use of a plastic bonding agent in the seams, an advantage is obtained over stitching since the glove covering material is not repeatedly punctured by the fabricating needle, which tends to weaken the glove at the seam. Moreover, such repeated puncturing in many instances causes a distortion of the glove and causes an unsightly wrinkling effect at the seam. Also, by the use of a thermoplastic or thermosetting bonding agent, the glove is just as impervious to liquids, gases, and other foreign substances at the seam as is any part of the rest of the glove, which is not the case where stitching is used.

This invention does not contemplate the use of ordinary cements or glues in which the bonding is obtained on heating primarily by a drying action.

In using either thermoplastic or thermosetting material, the bonding on heating is not obtained by a drying action but probably is obtained by either a physical or chemical rearrangement of the bonding material. This does not mean that it is not desirable in many cases to incorporate the plastic in a solvent or a binding material which disappears upon heating, but the bond is not one obtained purely by evaporation of a solvent. Rather, the solvent or binder serves as a carrier to conveniently apply the plastic to the surfaces.

In one operation, the thermoplastic material is fed into the seam in the form of a welt, and then heated by passing through a high frequency field between two electrodes whereby the seam is bonded by the plastic by induction or dielectric heating and not by directly applied heating. In other words, a high frequency current, which causes the heating, is passed through the material and plastic to bring about the bonding. This permits the use of machines for obtaining the welding of thermoplastic materials by a high frequency field wherein the seam is mechanically drawn through electrode work wheels, and the feeding operation of the machine is similar to present-type stitching or sewing machines. Mandrels may be used for positioning the glove and for providing the electrodes required for the high frequency field.

In the preferred operation it is desirable to precoat the section of the material along the seam with thermoplastic material, in which case it is dissolved in a solvent and the material first placed along the seam and allowed to cure or dry. After it is dried, it is passed through a high frequency field and welded. However, it is preferred to use a thermoplastic adhesive such as cellulose nitrate which does require a high temperature to soften and which does not change its composition during the heat treatment, and which eliminates the so-called curing step. Such a thermoplastic material requires a temperature range from 130° to 200° C. to form a proper bond. In general, for most of the plastics, the temperature required for proper bonding varies from 100° to about 250° C. As a rule, high pressures are not required to effect the bond, but moderate pressures of 2 to 25 pounds per square inch may be used with beneficial results. Enough pressure should be applied and in such a manner as to insure the formation of uniform seams well-bonded.

In some glove constructions, it is desirable to use thermosetting materials rather than thermoplastic materials, although in general, thermosetting materials do not permit as rapid construction as do thermoplastic materials. Thermosetting materials are preferable, especially in the manufacture of welder's gloves, and the like, manufactured from heat resisting materials and which are subjected to intense heat, since they do not tend to soften but rather tend to harden upon heating. In making a glove in this manner, it is preferable to coat the seam edge with a thermosetting material having a consistency of a viscous liquid and then passing the seam between two electrodes wherein the heating is obtained by induction. However, the thermosetting material may be mixed with a suitable binder or may extrude it and insert it in the seam prior to the heating in a manner similar to feeding welt to a seam, which is a well-known method in ordinary stitching procedures.

It is preferred to use induction heating because it does not involve the handling of hot apparatus as is necessary in directly applied heating and permits a better control by the operator of the heating during bonding which is necessary in forming sharp curves required on the fabrication of gloves and the like. In addition, induction heating heats the material uniformly through the seam and does not subject the glove material to a higher temperature than the plastic bond. It has been found that a better result is obtained by induction heating than is obtained by applied heating which may be due to a different arrangement, either physical or chemical, of the plastic material, although the exact explanation is not known. The frequency of the current used to form the bond by induction heating may vary from several hundred-thousand to several hundred-million cycles per second, depending on the material to be bonded, and the type of plastic adhesive used.

I claim as my invention:

1. A method of making a sectional hand covering comprising preforming two or more hand covering sections from non-plastic materials, applying along the marginal edges of the hand covering sections a heat responsive plastic water impervious bonding agent and joining said marginal edges by heat and pressure to form a water impervious bond between the plastic bonding edge and the non-plastic hand covering sections, said joining of said marginal edges consisting of the only joining step of the operation.

2. A method of making a sectional hand covering comprising preforming two or more hand covering sections from non-plastic materials, applying along the marginal edges of the hand covering sections a heat responsive thermoplastic water impervious bonding agent and joining said marginal edges by heat and pressure to form a water impervious bond between the thermoplastic bonding edge and the non-plastic hand covering sections, said joining of said marginal edges consisting of the only joining step of the operation.

JOSEPH SHMIKLER.

REFERENCES CITED

The following references are of record in the file of this patent:

UNITED STATES PATENTS

| Number | Name | Date |
|---|---|---|
| 2,087,480 | Pitman | July 20, 1937 |
| 2,283,698 | Redman | May 19, 1942 |
| 2,314,701 | Harvey | Mar. 23, 1943 |
| 2,335,159 | Salfisberg | Nov. 23, 1943 |
| 2,390,550 | Moore | Dec. 11, 1945 |
| 2,394,532 | Shmikler | Feb. 12, 1946 |
| 2,433,327 | Anderson | Dec. 30, 1947 |